Feb. 7, 1967     H. H. STRYKER     3,302,218
TURNING FRAME

Filed May 28, 1965     7 Sheets-Sheet 1

INVENTOR.
HOMER H. STRYKER
BY
*Woodhams, Blanchard & Flynn*
ATTORNEYS

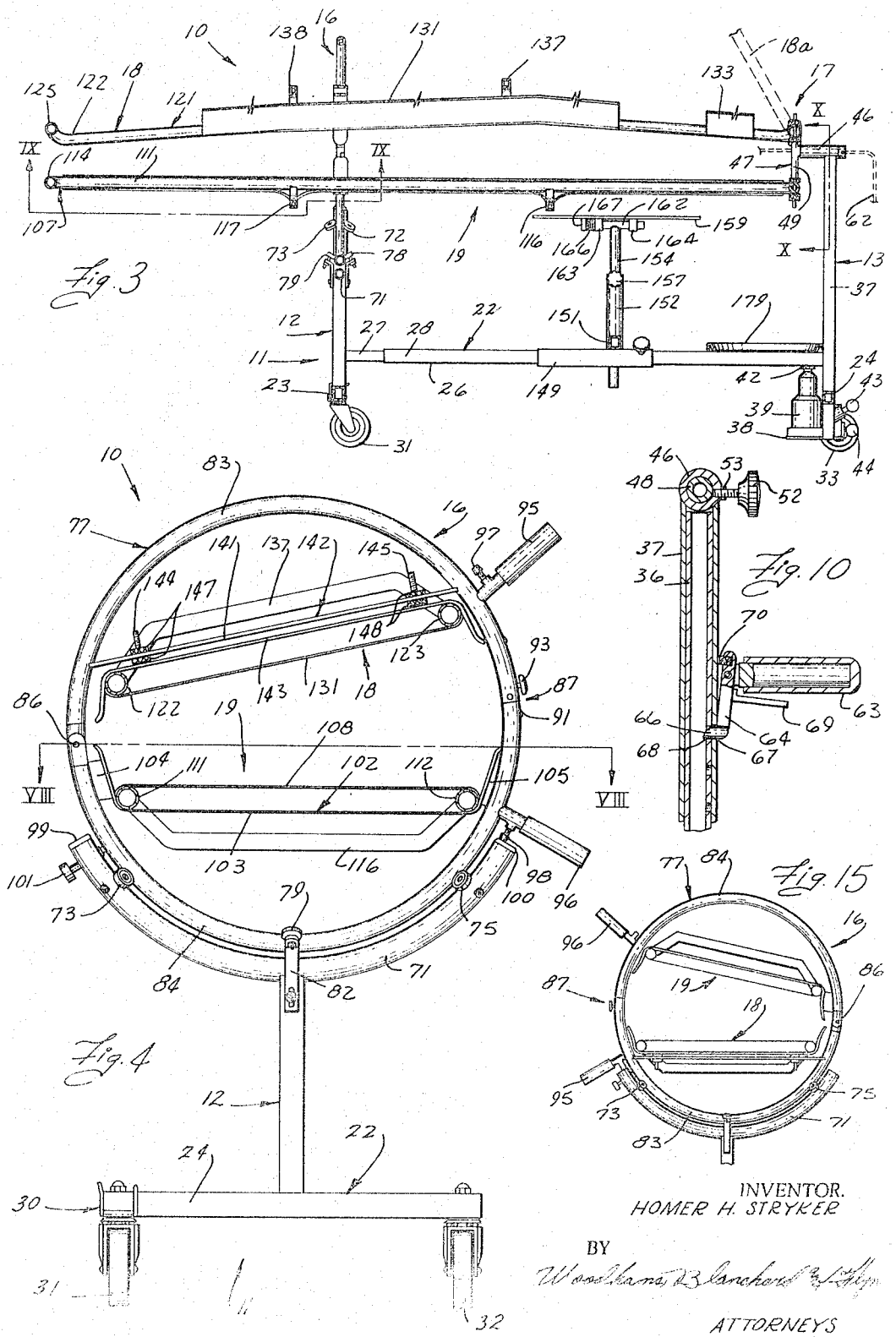

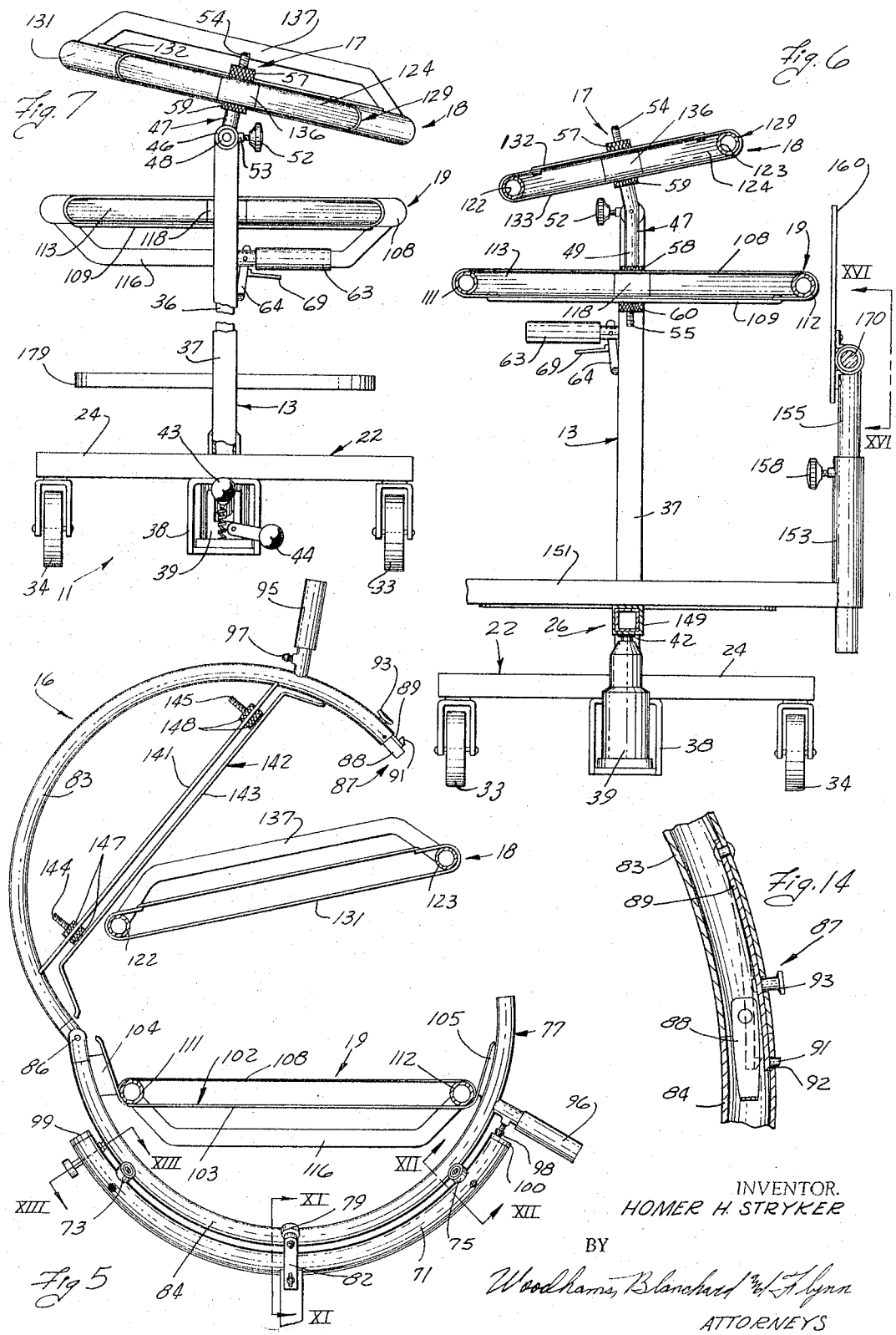

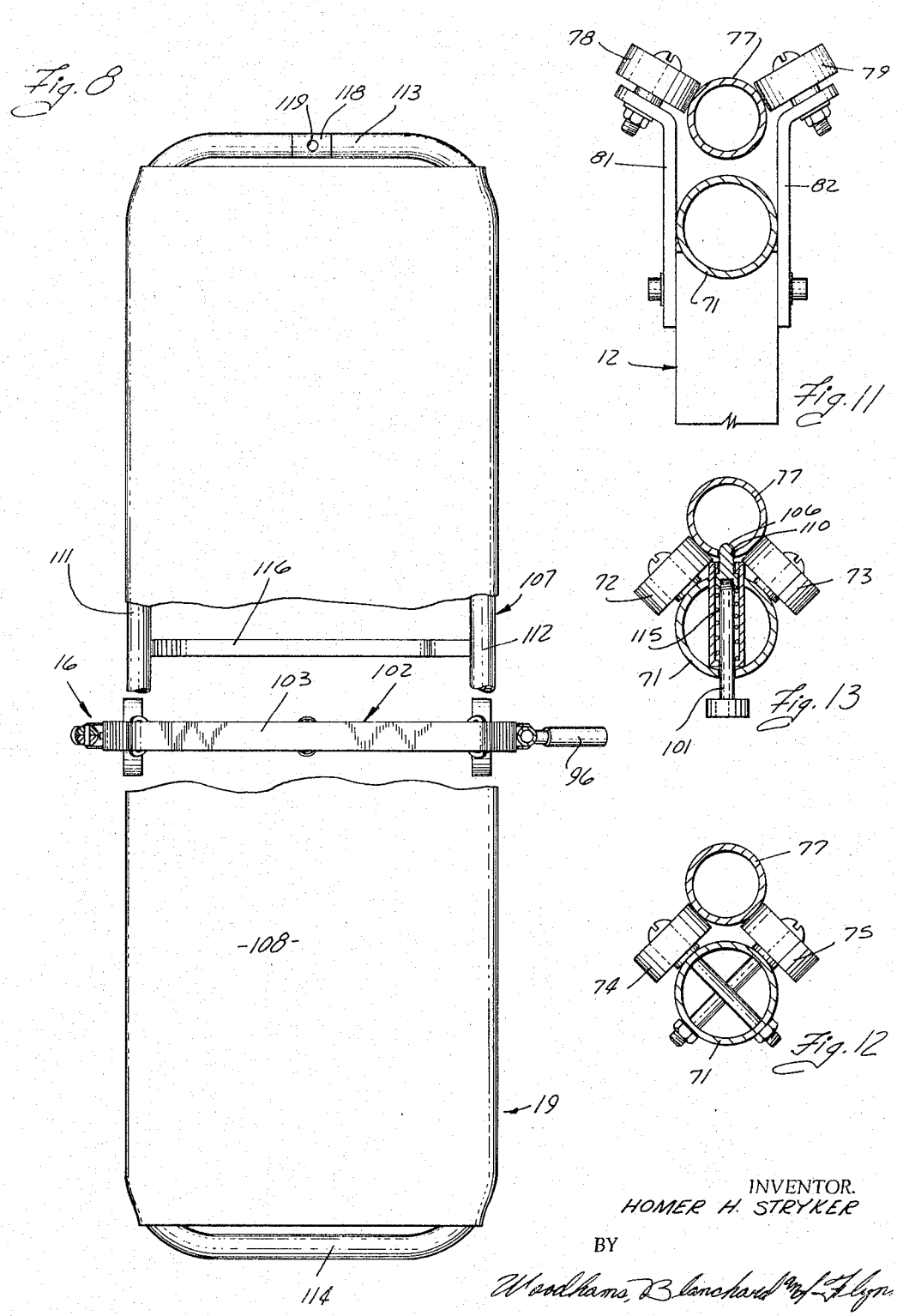

Feb. 7, 1967  H. H. STRYKER  3,302,218
TURNING FRAME
Filed May 28, 1965
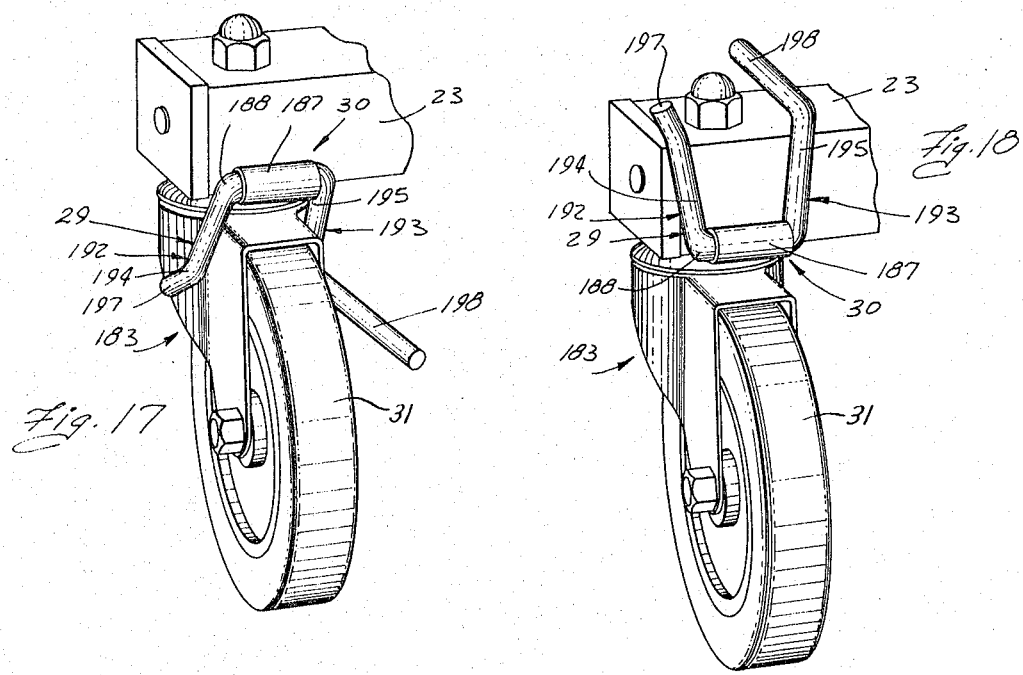
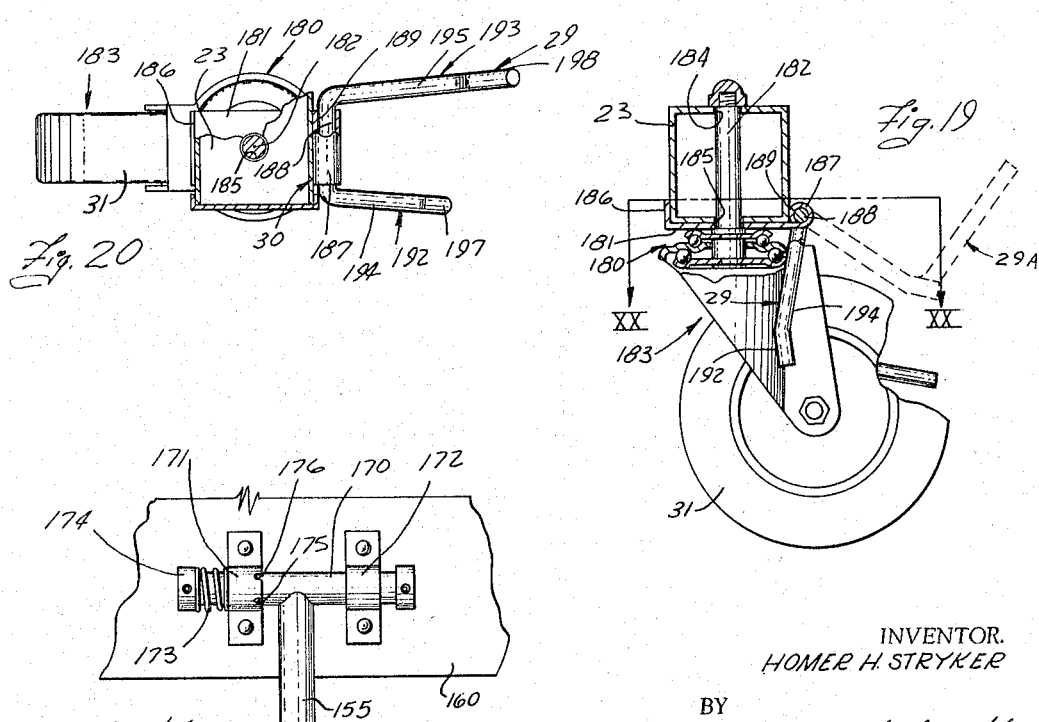
INVENTOR.
HOMER H. STRYKER
BY
Woodhams, Blanchard and Flynn
ATTORNEYS

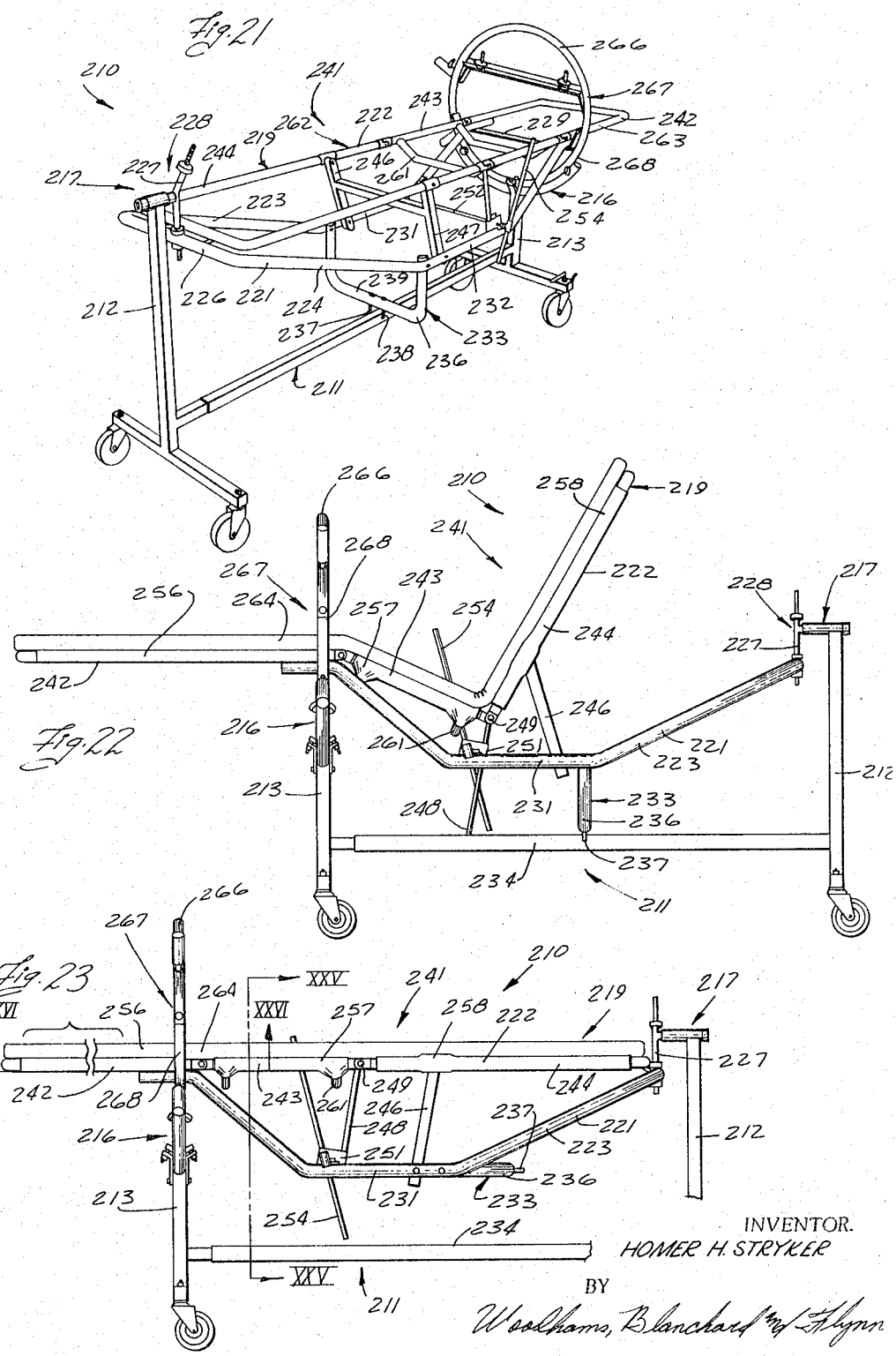

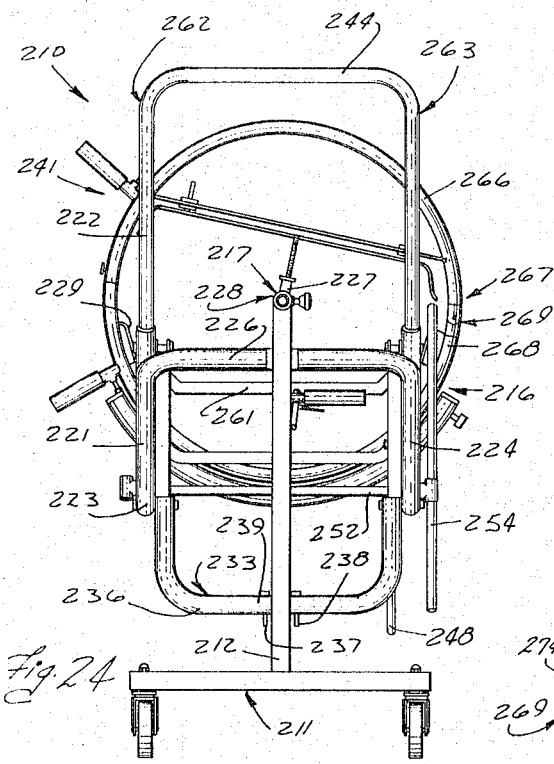
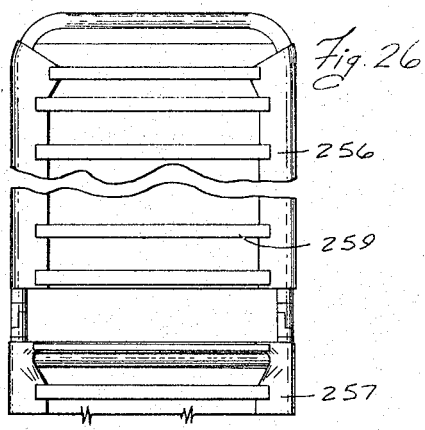
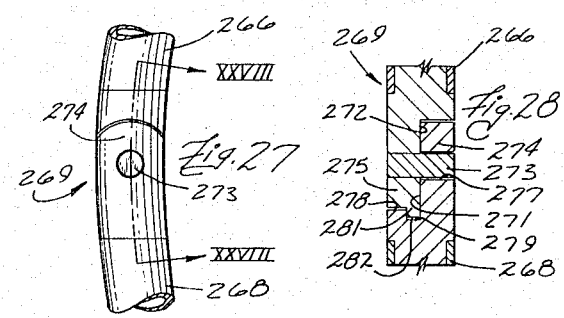
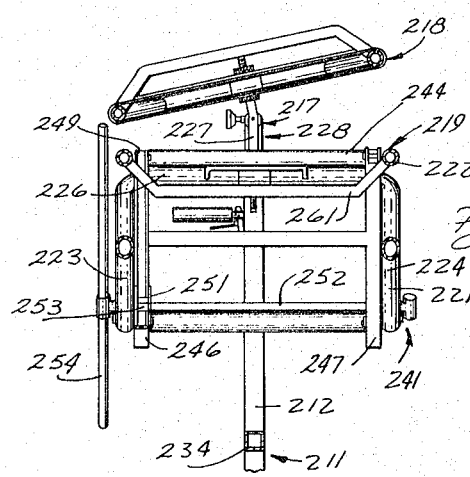
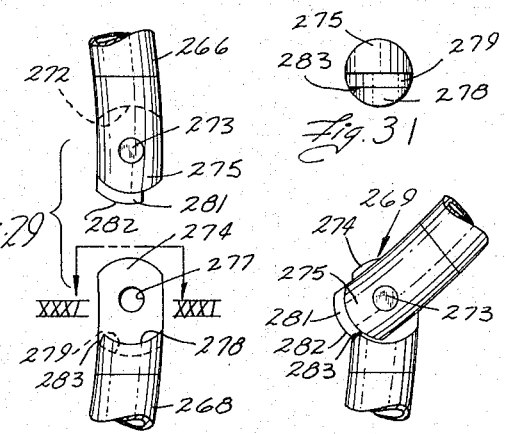

United States Patent Office 3,302,218
Patented Feb. 7, 1967

3,302,218
TURNING FRAME
Homer H. Stryker, Kalamazoo, Mich., assignor to Stryker Corporation, Kalamazoo, Mich., a corporation of Michigan
Filed May 28, 1965, Ser. No. 459,608
12 Claims. (Cl. 5—61)

This invention relates in general to a wheeled apparatus for supporting and moving a patient and, more particularly, to an apparatus whereby a patient can be held in a substantially horizontal position for rotation around the lengthwise axis of the patient through an angle of approximately 180° and whereby such rotation can be effected easily by one person without any risk of dropping the patient.

Turning apparatuses, or turning frames as they are frequently called, have been successfully used by physicians for many years. In fact, the applicant herein believes that he developed and introduced the first such turning frame for use by physicians. Thus, this type of patient supporting structure is commonly known in the medical profession as the "Stryker Turning Frame." The Stryker Frame, and recent copies thereof, have in general served their purpose satisfactorily for many years. However, the applicant, in a continuing effort to improve upon his initial development, found that certain special circumstances, as well as some average circumstances, created problems which, while not critical, should and could be advantageously eliminated, particularly to increase the comfort of the patient.

For example, it was found that existing turning frames often gave the patient a feeling of insecurity, at least, when the turning operation was performed. That is, the patient was fearful that he would slide from between the anterior and posterior support frames as he was being rotated. However, even when the turning frame properly held the trunk of a patient firmly in place, it often permitted the legs to shift sidewardly during a turning movement unless they were otherwise held in position by straps or the like. This problem has been aggravated in those frames wherein the patient supports are mounted at their opposite ends, only.

In an effort to avoid this problem, it has been customary to wrap bands or straps completely around the posterior and anterior frames, intermediate the ends thereof, for the purpose of holding said frames firmly against the patient during a turning movement and also for the purpose of preventing an accidental dislodgement of the patient from between the frames during the turning movement. In fact, even where there was little or no chance that the patient would slip out from between the frames during a turning movement, the bands were and are frequently used merely to give the patient the added feeling of security.

The applicant developed a complete solution for this problem by providing a carefully designed contour in one of the patient supporting members and by arranging the two patient supporting members at a small transverse angle. Since this arrangement not only positively prevents the accidental dislodgement of the patient during the turning movement, but also gives the patient a feeling of real security during the turning movement, the intermediate bands are no longer necessary with applicant's invention.

The previous, conventional turning frames were usually designed for accommodating an adult of average size. Accordingly, difficulties were often encountered when such conventional turning frames were used on relatively large patients or relatively small patients. For example, previous frames had inadequate provision for adjustment of the spacing between the patient supporting members, so that the frames were built for the average or the large patient. Thus, the relatively small patient almost always experienced a feeling of apprehension, if not outright fear, or pain, when the turning frame moved to the position wherein the patient had one side facing downwardly. That is, the patient had the feeling that he might slip from between the two patient supporting frame members. Also, if his relatively smaller legs were not securely held in place, they would often tend to slide sideways. Moreover, if the patient suffered from some form of leg or back injury and the legs were not tightly secured in place, some pain could be experienced by the patient as the result of sideward shifting of the legs during the turning operation in existing turning frames, even though the major part of the patient's body remained unmoved.

In existing turning frame structures, it is common practice to mount the patient supporting or engaging members upon rotatable mechanisms located at the opposite ends of the turning frames. This has resulted in no support of the patient supporting members between their ends, thereby requiring excessively sturdy support frames, which will not sag under the weight of the patient, and rigid end support posts, which will not flex toward each other under said patient load. This heavier and more costly construction is also more difficult to handle. Furthermore, as a result of this arrangement, both ends of the patient engaging frames have been blocked so that placing of the patient within the frame must be performed by working entirely from the side of the frame. Moreover, turning of the frame has usually required an attendant at both ends of the frame.

Under some circumstances, especially where the patient is seriously ill or seriously injured, transfer of the patient from one supporting surface to another is not only difficult, but sometimes dangerous. With existing turning frames, it has in general been necessary to use some type of carrying device, such as a stretcher, in order to transfer the patient from one surface, such as an operating table, into the turning frame. That is, it has not been feasible to use one of the patient supporting members of existing turning frames for carrying the patient. This is mainly due to the fact that it has been so difficult to remount the supporting member on the turning frame supports with the patient supported thereon.

Sometimes it is either desirable or necessary to raise or lower one end of the patient. With existing frame structures, such raising and lowering is difficult at best, and usually too dangerous to attempt.

Accordingly, the objects and purposes of the invention are to provide a wheeled turning frame for supporting and moving a patient wherein:

(1) The patient can be safely supported in a substantially horizontal position for turning movement around the lengthwise axis of the patient without discomfort or the resulting fear of apprehension and whereby the patient can be moved from a supine position to a prone position or vice versa;

(2) The turning frame includes a wheeled undercarriage for convenient movement of the patient from one location to another and a vertically adjustable device on the turning frame for raising and lowering one end of the patient supporting members;

(3) The patient can be cared for, including the changing of his position, by a single attendant, and the patient supporting members are arranged so that they automatically adapt themselves to small variations in the thicknesses of the patients, but can be adjusted for large differences in the size or thicknesses of patients quickly and easily;

(4) One of the patient supporting members can be quickly and easily removed from the apparatus for the purpose of transferring the patient to the turning frame, with a minimum of effort by the handlers or discomfort to the patient;

(5) One of the patient supporting members adapted for articulation whereby the patient can be easily and quickly moved from a supine position to a substantially sitting position without removal from the turning frame and without impairing in any way the utility of the frame for its above-mentioned purposes;

(6) The structure is light in weight, adequately sturdy in strength, relatively easy to maintain and versatile in use.

Other objects and purposes of this invention will become apparent to persons familiar with this type of equipment upon reading the following specification and examining the drawings, in which:

FIGURE 3 is a sectional view taken along the line III—III in FIGURE 2.

FIGURE 4 is a sectional view taken along the line IV—IV in FIGURE 2.

FIGURE 5 is a fragment of FIGURE 4 showing the parts thereof in different positions of operation.

FIGURE 6 is a sectional view taken along the line VI—VI in FIGURE 2.

FIGURE 7 is a broken and elevational view of the head end of the apparatus.

FIGURE 8 is a broken, sectional view taken along the line VIII—VIII in FIGURE 4.

FIGURE 10 is an enlarged, sectional view taken along the line X—X in FIGURE 3.

FIGURE 11 is an enlarged, sectional view taken along the line XI—XI in FIGURE 5.

FIGURE 12 is an enlarged, sectional view taken along the line XII—XII in FIGURE 5.

FIGURE 13 is an enlarged, sectional view taken along the line XIII—XIII in FIGURE 5.

FIGURE 14 is an enlarged fragment of FIGURE 4 taken in central cross section.

FIGURE 15 is a reduced fragment of FIGURE 4 showing the structure thereof in a different position of operation.

FIGURE 16 is an enlarged, sectional view taken along the line XVI—XVI in FIGURE 6.

FIGURE 17 is a perspective view of the left rear wheel and a fragment of an associated part of said apparatus.

FIGURE 18 is a perspective view of said left rear wheel with a part thereof in a different position.

FIGURE 19 is a fragmentary side view of the wheel appearing in FIGURE 17.

FIGURE 20 is a sectional view taken along the line XX—XX in FIGURE 19.

FIGURE 21 is a broken, perspective view of a modified apparatus embodying the invention.

FIGURE 22 is a side elevational view of said modified apparatus with the posterior patient support member in a sitting position, and with the anterior patient support removed.

FIGURE 23 is a fragment of FIGURE 22 with the posterior patient support in the horizontal position of operation.

FIGURE 24 is a front end view of the modified apparatus appearing in FIGURE 22.

FIGURE 25 is a sectional view taken along the line XXV—XXV in FIGURE 23.

FIGURE 26 is a sectional view taken along the line XXVI—XXVI in FIGURE 23.

FIGURE 27 is an enlarged fragment of the hinge structure appearing in FIGURE 4 and showing a modified form thereof.

FIGURE 28 is a sectional view taken along the line XXVIII—XXVIII in FIGURE 27.

FIGURE 29 is an exploded view of the structure shown in FIGURE 27 as it appears from the opposite side.

FIGURE 30 is a side view of the structure appearing in FIGURE 29 when it is assembled.

FIGURE 31 is a sectional view taken along the line XXXI—XXXI in FIGURE 29.

Figure 1:
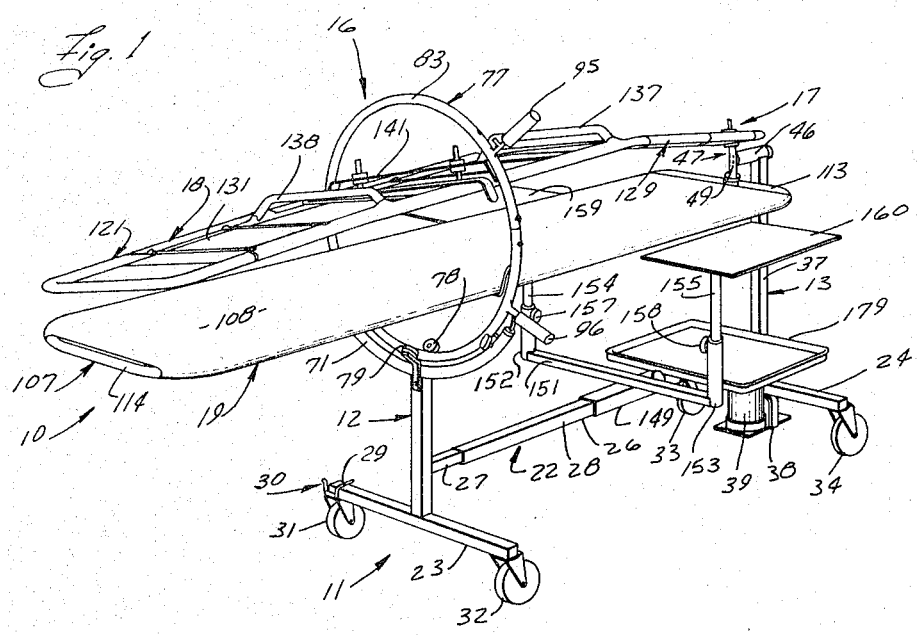
FIGURE 1 is a perspective view of a wheeled apparatus embodying the invention.

For convenience in description, the terms "upper," "lower" and words of similar import will have reference to the apparatus of the invention as appearing in FIGURES 3 and 4. The terms "front" or "head" and "rear" or "foot" and words of similar import will have reference to right and left ends, respectively, of the apparatus of the invention as appearing in FIGURES 2, 3 and 22. The terms "inner," "outer" and derivatives thereof will have reference to the geometric center of said apparatus and parts thereof.

General construction

The objects and purposes of the invention, including those set forth above, have been met by providing a wheeled turning frame having a wheeled base upon which a pair of spaced upright posts are mounted, preferably for adjustment toward and away from each other. Both of said posts have support mechanisms mounted upon or near their upper ends for engaging and positioning a pair of substantially flat and elongated patient supporting members, which resemble stretchers. One of said support mechanisms is removably secured to corresponding ends of the two patient supporting members which are engaged approximately midway between their ends by the other support mechanism.

The two support mechanisms are arranged and constructed so that they position the patient supporting members at small transverse angles with respect to each other. Moreover, said support mechanisms are preferably mounted upon their respective posts for effecting rotation of said patient supporting members around an axis extending lengthwise of, and preferably located between, said supporting members through an arc of not more than approximately 180°. More specifically, due to the transverse angle between the patient supporting members, the rotatable assembly, which includes the two supporting members, is normally rotated through an angle of 180° minus said transverse angle for the purpose of moving the patient from a supine to a prone position or vice versa. The post connected to the ends of said patient supporting members may be arranged for vertical adjustment, and at least one of said patient supporting members is preferably mounted upon said support mechanisms for easy removal therefrom.

As the following descriptive material is examined, it should be kept in mind that applicant's invention relates to a lightweight, inexpensive and easily movable turning frame for holding a patient in a prone or supine position and for rotating the patient safely between these positions. That is, the principal advantages of this structure reside in its simplicity, ease of handling, safety and modest cost.

Detailed description

The wheeled apparatus or turning frame 10 (FIGURES 1 and 2), which has been selected to illustrate a preferred embodiment, comprises an under-carriage 11 having a pair of spaced, upright posts 12 and 13 at the foot and head ends, respectively, thereof. Support mechanisms 16 and 17 are mounted upon the posts 12 and 13, respectively, preferably near the upper ends thereof for the purpose of engaging and positioning a pair of elongated patient engaging members or supports 18 and 19 so that they can be rotated together around an axis lengthwise of and preferably between said engaging members.

More specifically, the undercarriage 11 (FIGURES 1 and 3) has a base frame 22 comprised of a pair of similar, spaced and preferably parallel end members 23 and 24 upon the central portions of which said posts 12 and 13 are respectively mounted. Said base frame 22 also includes a longitudinal beam 26 comprised of a pair of telescoped tubular members 27 and 28, which are respectively connected to the posts 12 and 13 near the end members 23 and 24 whereby the posts 12 and 13 can be moved toward and away from each other by sliding one of the tubular members 27 and 28 with respect to the other.

Wheels 31 and 32, which are preferably castered and swiveled, are mounted upon and extend downwardly from the opposite ends of the end member 23. Wheels 33 and 34, which are also preferably swiveled and castered, are mounted upon and extend downwardly from the opposite ends of the end member 24 so that said wheels 31, 32, 33 and 34 can simultaneously engage a substantially flat surface. One of the wheels, here the left rear wheel 31, is selectively engageable by the U-shaped lock element 29 of the wheel lock 30 which is mounted upon the leftward end of the rear end member 23, as described in detail hereinafter.

The post 13 preferably has an inner tubular member 36, which is rigidly secured to the end member 24, and an outer tubular member 37 which is sleeved upon the inner tubular member 36 as shown in FIGURES 7 and 10. A saddle 38 (FIGURE 3) is secured to and extends downwardly from the central portion of the end member 24, preferably directly below the post 13, for supporting a hydraulic cylinder or actuator. The piston 42 (FIGURES 3 and 6) of the actuator 39 is located directly below the tubular member 28 of the beam 26 for engagement therewith, whereby the outer member 37 of the post 13 can be moved upwardly along and with respect to the inner member 36. The piston 42 may be urged upwardly by operation of the foot lever 43 and then permitted to move back downwardly by moving the bleed valve lever 44 upwardly whereby the fluid urging the piston 42 upwardly can escape into the reservoir portion of the actuator 39.

A pivot sleeve 46 (FIGURES 1 and 3), which is part of the support mechanism 17, is secured, as by welding, upon the upper end of member 37 so that the axis of said sleeve 46 is substantially parallel with the beam 26. A substantially T-shaped member 47 has its cylindrical stem 48 (FIGURES 7 and 10) rotatably disposed within the sleeve 46 and its tubular crossbar 49 adjacent the rearward end of said sleeve 46. A manually operable clamping screw 52 is threadedly received through a boss 53 on the sleeve 46 for engaging the stem 48 to hold the T-shaped member 47 against rotation.

For reasons appearing hereinafter, the crossbar 49 has a bend therein at the point of its connection to the stem 48 so that the portions of the crossbar on opposite sides of said stem are disposed at an included angle of approximately 165° with respect to each other. For reasons which become more apparent hereinafter, this included angle may be varied from between 160° to 173°, depending upon the specific functions to be performed by the particular turning frame and/or apparatus 10. Screws 54 and 55 (FIGURE 6) extend preferably coaxially with and from the opposite ends of the crossbar 49, to which they are rigidly secured, for engagement by the nuts 57, 58 and 59, 60, respectively. The stem 48 has a lengthwise opening therethrough which communicates with a coaxial opening in the crossbar 49 whereby a traction cable indicated by broken lines at 62 in FIGURE 3, can be threaded through the T-shaped member 47, for conventional purposes.

A sidewardly extending handgrip 63 (FIGURE 7) is secured to, and extends sidewardly from, the post 13 near its upper end. A manually operable lever 64 (FIGURE 10) is pivotally mounted upon the handgrip 63 adjacent the post 13.

A locking finger 66, which is secured to the lower end of the lever 64, extends through an opening 67 in the outer member 37 of the post 13 and is extendable into one of several vertically spaced openings 68 in the inner member 36 for locking said outer member 37 in a raised position. A manually engageable bar 69 is secured to the lever 64 and extends beneath the handgrip 63 for engagement to withdraw the locking finger 66 from engagement with the inner member 36. A spring 70 may be provided to continuously urge the finger 66 into engagement with the inner member 36, whereby accidental disengagement of the finger is minimized. The beveled upper side on the finger 66 permits upward, but not downward, movement of the outer member 37 with respect to the inner member 36 without manual retraction of the finger 66 by operation of the bar 69.

An arcuate, tubular support member 71, which is part at the support mechanism 16 (FIGURES 4 and 5) is secured, as by welding, preferably approximately midway between its opposite ends upon the upper end of the post 12 so that the concave side of said support member 71 faces upwardly. As shown in FIGURES 12 and 13, four rollers are mounted in the sets 72, 73 and 74, 75 near the upper side of the support member 71 and near its opposite ends (FIGURE 5) for cradling and rotatably supporting a circular member 77 preferably for rotation substantially around the axis of the pivot sleeve 46 (FIGURE 1) and substantially concentric with the support member 71. A third pair of rollers 78 and 79 (FIGURE 11) are rotatably supported upon the upright bars 81 and 82 which are adjustably mounted upon the front and rear sides, respectively, of the upper end of the post 12 so that they extend upwardly along the opposite sides of the support member 71 and the adjacent portion of the circular member 77. The rollers 78 and 79 are arranged so that they engage the upper or concave side of the adjacent portion of the circular member 77 at points well below the rollers 72, 73 and 74, 75, thereby holding said circular member in an erect position and downwardly against the rollers 72, 73 and 74, 75. This arrangement of the afore-mentioned rollers holds the circular member in said concentric position with respect to the support member 71 while, at the same time, permitting rotation of said circular member around its central axis.

The circular member 77 (FIGURE 5) is divided into substantially semi-circular segments 83 and 84 which are pivotally connected at one set of corresponding ends by the pivot pin 86 and releasably connected at their other corresponding ends by a locking mechanism 87. Specifically, the locking mechanism 87 (FIGURE 14) includes a U-shaped guide member 88 secured to the anterior segment 83 and is slideably extendable into the open end of the posterior segment 84. A resilient finger 89, which is secured near one end within and to the open end of the segment 83, extends along and is receivable into the recess in the guide bar 88. Said finger 89 has a projection 91 removably receiveable into an opening 92 in the side wall of the adjacent portion of the posterior segment 84. A push button 93 is connected to the resilient finger 89 for bending it so that the projection 91 can be released from within the opening 92.

A pair of handgrips 95 and 96 (FIGURE 5) are mounted upon the segments 83 and 84, respectively, near the locking mechanism 87 so that said grips extend approximately radially from their respective segments. A pair of bumpers 97 and 98 are mounted upon the handgrips 95 and 96, respectively, and extend circumferentially along the segments 83 and 84, respectively, in opposite directions. Thus, the bumper 97 is engageable with the end cap 99 on one end of the support member 71 and the bumper 98 is engageable with the end cap 100 on the opposite end of the support member 71, whereby the rotational movement of the circular member 77 is positively limited. The bumpers 97 and 98 are adjustable to change in small amounts the angular movement of the circular member 77. In this particular embodiment, the bumpers 97 and 98 are positioned and the length of the support member 71 is selected so that the rotational movement of the circular member 77 extends through an angle of approximately 180° minus the transverse angle between the patient supports 18 and 19, as discussed hereinafter. In one preferred embodiment, this angle of rotational movement of the circular member 77 is approximately 165°.

A substantially U-shaped hanger 102 (FIGURES 4 and 5) is secured to the posterior segment 84 so that it opens upwardly and its web 103 is in a substantially horizontal position when the bumper 98 is against the end cap 100. The hanger 102 is secured to the posterior segment by the gussets 104 and 105 near the opposite ends of the web 103. The length of the web 103, hence the width of the hanger 102, is preferably about equal to the width of the posterior engaging member 19.

As indicated in the foregoing descriptive materials, many of the structural elements of the undercarriage 11 (FIGURE 1) and the support mechanisms 16 and 17 may be, and preferably are, fabricated from metal tubes of either rectangular or circular cross section, and these tubes are preferably fabricated from steel. Thus, the weight is maintained at a minimum and is consistent with the strength and rigidity which are required in this type of structure.

The circular member 77 (FIGURE 13) is positively held against movement with respect to the support member 71 by the reception of the pin 106, which is mounted in the support member 71, into the hole 110 in the posterior segment 84. The pin 106 is resiliently urged by a spring 115 against the circular member 77, and the clamping screw 101 is mounted upon the support member 71 for positively holding the pin 106 within the hole 110.

Figure 9:
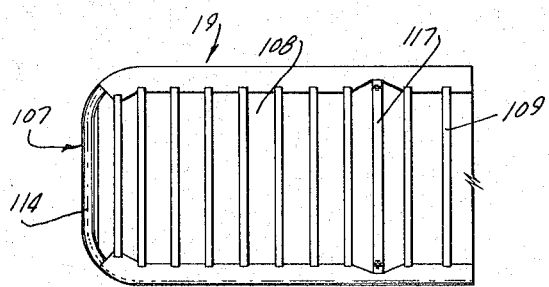
FIGURE 9 is a sectional view taken along the line IX—IX in FIGURE 3.

The posterior patient support or engaging member 19 (FIGURES 8 and 9) is comprised of a substantially rectangular, metal frame 107, which is preferably fabricated from tubular aluminum, and a cover sheet 108 which is tightly held upon one side of the frame 107 by elastic elements 109 located on the opposite side of the frame. The frame 107 has a pair of lengthwise side elements 111 and 112 and the head and foot elements 113 and 114. A pair of substantially U-shaped brace bars 116 and 117 (FIGURE 3) are rigidly secured to and extend between the side elements 111 and 112 at positions lengthwise thereof about one-third of the distance inwardly from the respective head and foot elements 113 and 114.

The head element 113 has a short, coaxial portion 118 (FIGURE 6) midway between the ends thereof which is supported for pivotal movement around its axis with respect to the remainder of the head element 113, and which has a transverse opening 119 (FIGURE 8) therethrough. The screw 55 (FIGURE 6) on the T-shaped member 47 is slideably received through the transverse opening 119, after the nut 58 has been placed upon said screw, and then the nut 60 is threadedly placed upon the screw 55 to thereby hold the head end of the posterior support 19 with respect to the T-shaped member 47, hence with respect to the post 13. The hanger 102 (FIGURE 8) is located with respect to the T-shaped member 47 preferably so that the portion of the posterior support 19 which carries the hips of the patient will be located between the hanger 102 and the head element 113 of the frame 107, but as close to the hanger 102 as permissible without creating discomfort for the patient. By this arrangement, the center of gravity of the patient is maintained between the posts 12 and 13, hence between the wheels supporting the undercarriage 11. Also, this arrangement permits fabrication of the frame 107 from relatively lightweight materials since it eliminates the relatively long weight supporting spans found in previous turning frames of this type.

The anterior patient support or supporting member 18 (FIGURES 1, 2 and 3) is comprised of an elongated, substantially rectangular frame 121 having a pair of elongated side elements 122 and 123 connected at their corresponding ends to the end elements 124 and 125, all of which elements may be integral parts of a metal tube bent into this shape. The head end portions 127 and 128 of the side elements 122 and 123, respectively, are preferably offset toward each other so that the head end 129 of the frame 121 is substantially narrower than the remainder of the frame.

A main cover 131 (FIGURE 2) extends along one side of the frame 121 around the side elements 122 and 123 where it is held by elastic elements 132. The main cover sheet 131 extends up to the reduced portion 129, and a small head band 133 extends around the narrow portion 129 at a distance spaced from the main cover sheet 131, thereby providing a face opening in the anterior support 18. The small head band 133 is also mounted upon the frame by one or more elastic elements 132. The narrow portion 129 of the frame 121 is preferably located so that the patient, indicated by broken lines at 134 in FIGURE 2, can wrap his arms comfortably around the narrow portion 129 of the frame 121, if he so wishes. The head end element 124 of the frame 121 has a small coaxial portion 136 pivotally supported about midway between the ends of the head element for rotation around its axis. The portion 136 of end element 124 has a central opening through which the screw 54 (FIGURE 6) extends with the adjustment nuts 57 and 59 on opposite sides of said portion. Said frame 121 has a pair of substantially U-shaped brace bars 137 and 138 which, as shown in FIGURE 1, are secured to and extend between the side elements 122 and 123 of the frame 121 about one-third of the distance inwardly from the end elements 124 and 125, respectively. By being offset away from the side of the frame supporting the cover sheet 131, said brace bars 137 do not interfere with or cause discomfort to the patient. The anterior patient support 18 as shown in FIGURES 1 and 3 has its two end portions preferably bent slightly with respect to its central portion toward the posterior patient support 18. This arrangement tends to compensate for the reduced thicknesses of the extremities of the patient 134 disposed between the two supports.

As shown in FIGURES 4 and 5, a rigid, metal support bar 141 is rigidly secured at its opposite ends to parts of the anterior segment 83 on the concave side thereof, preferably so that the bar 141 is in a substantially horizontal position when the bumper 97 is snugly against the end cap 99. A substantially U-shaped hanger 142 has an elongated web 143 which is rigidly and adjustably secured to, and held in parallel relationship with respect to the support bar 141 by a pair of spaced screws 144 and 145 and their associated nuts 147 and 148. The width of the hanger 142 is preferably such that it snugly and firmly receives the frame of the anterior patient support 18, as shown in FIGURE 4.

As shown in FIGURES 4 and 5, the U-shaped hangers 102 and 142 are both offset slightly with respect to the center of the circular member 77 in a direction away from the hinge pin 86. That is, if a patient is supported upon either of the patient supporting members 18 and 19 in a centered position with respect thereto, when they are in a susbtantially horizontal position, as viewed in FIGURES 4 and 15, respectively, the center of gravity of the patient will be slightly on that side of the axis of the circular member 77 away from the hinge pin 86. Thus, the weight of the patient will normally tend to resist rotation of the circular member 77 in a clockwise direction in FIGURE 4 and in a counterclockwise direction in FIGURE 15, thereby tending to prevent rotation of the circular member 77 from one terminal position thereof toward the other.

This off-balance arrangement serves another function, namely, to compensate for the slight shifting of a patient towards the hinge pin 86 during a turning movement, which cannot be completely avoided under any circumstances. That is, the bodies of all patients will tend to shift somewhat toward the hinge pin 86 during a turning movement regardless of how they are held, simply because flesh is not rigid. Due to the resiliency of the cover sheets 108 and 131, the normal amount of give in human flesh is augmented slightly by the give in the sheets 108 and 131. Thus, by placing the center of gravity of the patient rightwardly of the rotational axis by an amount approximately equal to half the distance that the patient will move leftwardly during a turning movement, the effort required to turn the patient remains very small. On the other hand, if the center of gravity of the patient were vertically in line with said rotational axis, then all of the movement would be to the left of the axis and, accordingly, would increase the difficulty of moving a patient through the last half of the turning movement. That is, it would be necessary to lift a substantial portion of his weight around the rotational axis.

As shown in FIGURES 1 and 3, a tubular member 149 is slideably sleeved upon the tubular member 28 of the beam 26 for slideable movement lengthwise thereof. A cross member 151 is rigidly secured, as by welding, to the tubular member 149 transversely thereof so that it extends about equal distances in both directions therefrom. A pair of upstanding sleeves 152 and 153 are rigidly secured to the opposite ends of the cross member 151 and a pair of tubular elements 154 and 155 are slideably disposed within the sleeves 152 and 153, respectively, where they can be releasably held in various positions of vertical adjustment by the manually operable clamp screws 157 and 158. Flat, rigid panels 159 and 160 are removably secured to the upper ends of the tubular elements 154 and 155, respectively, for adjustment around the axes of said tubular elements. Thus, since the tubular elements 154 and 155 are preferably adjacent one edge of the panels 159 and 160, they can be pivoted from their position of FIGURE 2, where they can serve as either tables or armrests, into storage positions as shown in FIGURE 6 with respect to the panel 160 beneath the posterior patient support 19. Thus, by sliding the tubular member 149 along the beam 26 with the panels 159 and 160 in their storage positions, they can also be used to support a bedpan with the appropriate type of patient support.

The panel 159 (FIGURE 3) and the panel 160 (FIGURE 6) are mounted upon the upper tubular elements 154 and 155, respectively, (FIGURE 1) for pivotal movement around a horizontal axis. More specifically, the tubular element 154 (FIGURE 3) has a cylindrical crosshead 162, the opposite ends of which are rotatably mounted upon the panel 159 by a pair of spaced brackets 163 and 164.

The tubular element 155 (FIGURE 16) has a crosshead 170 which is secured to the panel 160 in substantially the same manner and for substantially the same purposes as described above with respect to the crosshead 162 and the panel 159. That is, the crosshead 170 is pivotally held upon the panel 160 by the brackets 171 and 172. A collar 174 is mounted on the end of the crosshead 170 near the bracket 171. A spring 173 encircles the crosshead between the collar 174 and the bracket 171. A pin 175 is secured to the crosshead 170 on the other side of the bracket 171 and is receivable into any one of the grooves 176 in said bracket 171. The spring 173 is held under compression so that the crosshead 170 must be moved rightwardly with respect to the panel 160 before said panel can be freely pivoted around the crosshead 170.

By proper sideward and then pivotal movement of said panel 160, it can be moved into and thereafter held in a variety of different positions. For example, it can be held in the vertical position shown in FIGURE 6 where it will serve as a siderail for the lower one of the patient support members. As seen in FIGURE 1, the panel 160 serves as an auxiliary table.

The panel 159 may be adjustably and releasably held with respect to the crosshead 162 by means including the collar 167 and spring 166 (FIGURE 3) in a manner substantially as described above with respect to the panel 160.

A miscellaneous utensil tray 179 is mounted upon the tubular member 28 of the beam 26 adjacent the post 13 for convenience.

As shown in FIGURES 17 through 20, inclusive, the wheel lock 30 is comprised of a U-shaped lock element 29 which is rotatably supported upon one edge of a mounting plate 181. Specifically, the mounting plate 181 is substantially flat and has a central opening 185 (FIGURE 19) through which the pintle 182 of a swivel caster 183 is slideably received for further reception through vertically aligned openings 184 and 185 in the rear end member 23. The caster 183 has a swivel bearing 180. Said mounting plate 181 has an upwardly extending integral flange 186 on its front edge (FIGURES 19 and 20) and an integral cylindrical sleeve 187 on its rearward edge, said flange and said sleeve being closely and simultaneously adjacent the opposite sides of the rear end member 23.

The central section 188 (FIGURE 20) of the lock element 29 is rotatably supported within the opening 189 in the sleeve 187 so that said lock element can be pivoted freely from its unlocked position of FIGURE 18 into its locked position of FIGURE 17 with respect to the caster wheel 31. The leg sections 192 and 193 of the lock element 29 have slightly diverging inner portions 194 and 195 and materially diverging outer portions 197 and 198 which are specifically arranged to facilitate locking of the wheel 31. That is, if the lock element 29 is in its FIGURE 17 position and the caster is in its FIGURE 20 position, rotation of the caster 183 around the pintle 182 in either direction will cause said wheel to engage the appropriate end section 192 or 193, and thereby move the element 29 upwardly from its solid line position of FIGURE 19 toward its broken line position 29A, whereby the caster 183 can swivel into its FIGURE 17 position. The lock element 29 will then automatically drop into its solid line position of FIGURE 19, wherein the caster is positively prevented from swiveling. To release the caster 183 for swiveled action, the lock element 29 must be moved upwardly, as by hand or by foot, past the broken line position thereof in FIGURE 19. The outer portion 198 of the leg 193 is intentionally made longer and positioned approximately at a right angle to the inner portion 195 thereof to act as a counterweight and thereby hold the lock element 29 in its unlocked or raised position, as shown in FIGURE 18.

*Operation*

With the wheeled patient carrying apparatus or turning frame 10 in its FIGURE 1 position, it is ready for use. In order to receive a patient conveniently, the locking mechanism 87 (FIGURE 14) is opened by depressing the button 93 so that the anterior segment 83 (FIGURE 5) can be pulled upwardly away from the posterior segment 84 to provide unobstructed access to one or both of the patient supports 18 and 19. While the two patient supports may be releasably or even continuously held against the webs of their respective hangers 142 and 102, as by positive connections therewith, such is not necessary for completely satisfactory operation and use of the apparatus. Moreover, the lack of such connections greatly facilitates the use and cleaning of the apparatus, including the changing of the cover sheets 108, 131 and 133. Thus, FIGURE 1 shows the two patient supports in the position which they normally occupy when a patient is disposed therebetween. However, the foot end of the anterior patient support 18 would actually be resting upon the foot end of the posterior patient support 19 prior to occupancy of the apparatus by a patient.

At this point, the operator should tighten the clamping screw 101 (FIGURE 13) so that it holds the spring backed pin 106 against accidental dislodgement from the hole 110 in the posterior segment 84. Also, the clamping screw 52 (FIGURE 10) is tightened against the stem 48. By these means, the patient supports are positively prevented from rotating in either direction around the lengthwise axes thereof and the patient can be placed upon the posterior support 19 without risk of falling due to such rotation.

When the anterior segment 83 has been pivoted upwardly away from its position above the posterior segment 84, the anterior patient support 18 can also be pivoted upwardly into its broken line position 18a in FIGURE 3, due to the pivot portion 136 (FIGURE 6), where it cannot interfere in any way with the placing of the patient upon or removal of the patient from the posterior patient support 19. Under many circumstances, the patient may then be lifted by attendants and placed upon the posterior patient support 19.

Where it is advantageous or necessary to exercise maximum care in moving the patient, the posterior patient support 19 can be removed from the appartus 10 simply by removing the nut 60 from the screw 55. The posterior patient support 19 can then be placed upon the bed or other device holding the patient to minimize the problem of moving the patient onto the patient support, hence into the apparatus 10. Thereafter, the posterior patient support 19 can be moved with the patient thereon, as on a stretcher, to the apparatus 10 and placed therein so that the support 19 rests near its center of gravity upon the hanger 102. It is then a simple matter to reinsert the screw 55 through the opening 119 in the coaxial portion 118 and thereafter reattach the nut 60 to the screw 55. During this maneuvering, accidental movement of the circular member 77 (FIGURE 13) with respect to the support member 71 is positively prevented by the clamping screw 101 and the pin 106.

Figure 2:
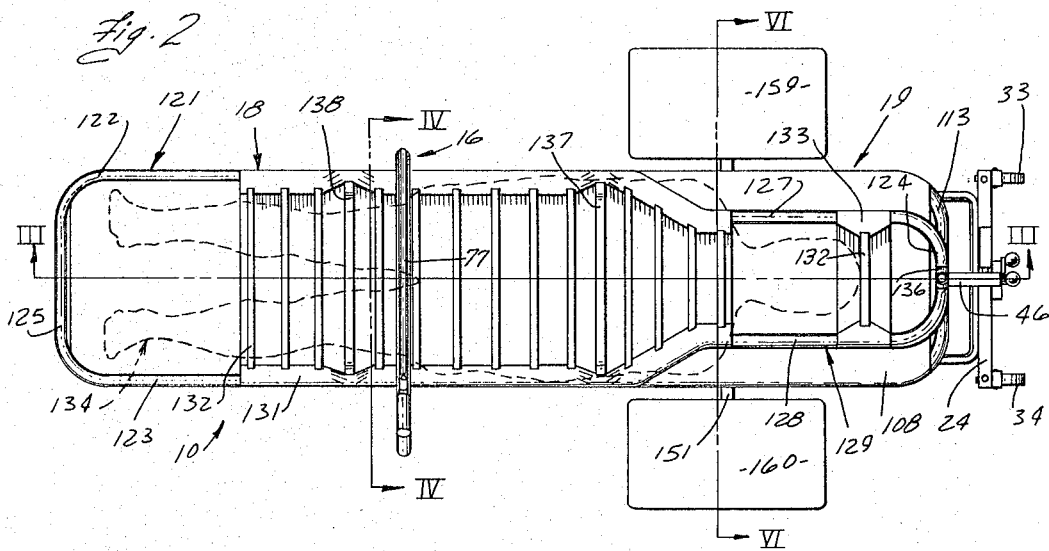
FIGURE 2 is a top plan view of said apparatus.

The anterior patient support 18 can now be moved into its position of FIGURES 1 and 2 so that it covers the upper surface of the patient 134, except for the patient's face which is disposed in the opening between the main cover sheet 131 and the small head band 133. The anterior segment 83 is now moved downwardly into its FIGURE 4 position and locked in place by the mechanism 87. Since the anterior patient support 18 is disposed at an acute angle, such as 15°, to the posterior support, the turning frame will accommodate small variations in patient sizes, without mechanical adjustment, simply by shifting the patient slightly toward one side or the other of the posterior frame. However, where a substantial variation is involved, snug engagement of the patient between the patient supports 18 and 19 can be effected by adjusting the nuts 147 and 148 upon the screws 144 and 145, respectively.

With the patient in position (FIGURE 2) between the patient supports 18 and 19, the patient can now be rolled substantially around his lengthwise axis from the supine position into the prone position merely by loosening the clamping screws 52 and 101, by grasping the handgrips 95 and 96 and then manually urging the circular member 77 to rotate. Because the center of gravity of the patient is at all times held close to the axis of the circular member 77, this rotation can be easily effected by any person capable of attending a patient. While the circular member 77 is not necessarily intended to engage the patient at any time during the normal operation of the apparatus 10, it will be recognized that this member serves as a further safeguard against accidental dislodgement of the patient from within the turning frame, particularly toward the open or rightward side thereof as appearing in FIGURE 4.

Because of the arrangement of the bumpers 97 and 98, the two side elements 111 and 122 will always pass beneath the patient as the patient is turned from the prone to the supine position or the reverse. Due to the transverse angular relationship between the patient supports 18 and 19, the distance between the side elements 122 and 111 will normally be considerably less than the thickness of the patient disposed between said supports. Thus, the side elements 111 and 122 will positively prevent the patient from sliding out of the turning frame as it is rotated. The sloping of the ends of the anterior support 18 toward the posterior support 19 compensates for the smaller thicknesses of the patient's extremities and thereby at least minimizes, if not eliminates, sideward shifting of such extremities during the turning of the patient. At any rate, the side elements 111 and 122 will be close enough to prevent sideward movement of the legs of the patient out of the turning frame during the rotation.

Where a patient is considerably smaller than average, the anterior hanger 142 can be adjusted toward the posterior hanger 102 by adjusting the nuts 147 and 148 on the screws 144 and 145, respectively. It will also be observed that the distance between the posts 12 and 13, hence the length of the undercarriage 11, can be adjusted by increasing or decreasing the amount of telescoping between the tubular members 27 and 28 of the beam 26. Thus, if a particular apparatus 10 is going to be used almost entirely for relatively small patients, such as children, it may be desirable to locate the circular member 77 with respect to the patient supports 18 and 19 in a somewhat different location than where said apparatus is being used primarily to support adults. Also, it may be desirable to change somewhat the location and amounts of the bends in the anterior patient support 18 where patients of a particular size and shape are to be handled on a particular apparatus. However, all of these adjustments are contemplated and can be easily made. Furthermore, the distance between the head ends of the patient supports 18 and 19 can be varied by appropriate adjustment of the nuts 57, 58, 59 and 60 upon their respective screws 54 and 55.

It is not uncommon for a patient to experience a condition, while the patient is being handled in a turning frame, which condition warrants the raising of one end of the patient with respect to the other. For example, it may be desirable to apply traction to the upper portion of the body of the patient by means of a suitable harness connected to a cable 62 (FIGURE 3) through the opening through the T-shaped member 47. In such case, the head ends of the patient supports 18 and 19 would normally be raised by operating the hydraulic actuator 39 which causes the outer member 37 to move upwardly with respect to the inner member 36. During such upward movement, the locking finger 66 (FIGURE 10) can move from one opening 68 to the next, due to the shape of the upper surface of the finger 66, without interference. When the outer member 37 reaches a proper height, the locking finger 66 is permitted to slide into the first opening 68 in the inner member 36 which it engages as the outer member 37 is permitted to move back downwardly. Usually, the hydraulic actuator 39 will hold the outer member 37 in its upward position. However, if the bleed valve lever 44 is accidentally tripped, no harm is done since the lever 64 must be manually moved outwardly to retract the finger 66 from an opening 68 before the downward movement can occur. Because of the coaxial pivoted portions 118 and 136 (FIGURE 6) in the end elements 113 and 124, respectively, and the fact that the patient supports 18 and 19 are merely engaged, as a general rule, by their respective hangers 142 and 102, said patient supports do not restrict the upward and downward movement of the head end of said patient supports 18 and 19.

*Modified structure*

The modified apparatus 210, which is disclosed in FIGURES 21 and 22, may have substantially the same type of undercarriage 211, including the posts 212 and 213 and their respective support mechanisms 216 and 217, as that described above with respect to the apparatus 10. The anterior patient support 218 (FIGURE 25) may also be identical with the above-described, anterior patient support 18 of the apparatus 10, but the posterior patient support 219 differs rather substantially from the posterior patient support 19.

The posterior patient support 219 is comprised of a rigid frame 221, which is mounted upon the support mechanisms 216 and 217, and an articulated frame 222, which is mounted on the fixed frame and engages the patient. The fixed frame 221 preferably includes a pair of metal and tubular side elements 223 and 224, which may be substantially parallel, and an end element 226, which is integral with and extends between head ends of the side elements 223 and 224. The end element 226 is preferably removably secured to one end of the crossbar 227 on a T-shaped pivot member 228 which is preferably identical with the T-shaped member 47, described above. The foot ends of the side elements 223 and 224 extend across and are preferably secured upon the posterior hanger 229 in the support mechanism 216.

The side elements 223 and 224 have downwardly offset, substantially parallel central portions 231 and 232. The end portions of the side elements 223 and 224, on opposite sides of the central portions 231 and 232, preferably slope upwardly toward the support mechanisms 216 and 217, respectively. This arrangement of the side elements 223 and 224 permits articulation of the frame 222, as described hereinafter, between its positions shown in FIGURE 21 and FIGURE 22.

Since it would be undesirable to have the patient supports 218 and 219 rotate around a horizontal axis while the articulated frame 222 is in its FIGURE 22 position, a lock device 233 is mounted upon the rigid frame 221 for engagement with the lengthwise beam 234 of the undercarriage 211. Specifically, the lock device 233 is comprised of a U-shaped tubular member 236 which is pivotally connected to and between the central portions 231 and 232 for pivotal movement around an axis preferably parallel with the end element 226. A pair of beam engaging elements 237 and 238 are secured to and project away from center part 239 of the U-shaped member 236. Said elements 237 and 238 are spaced from each other so that they will be disposed upon opposite sides of the beam 234, as shown in FIGURE 21, when said U-shaped member 236 is in its downwardly extending position, whereby said rotation of the frames 218 and 219 is positively prevented. However, the U-shaped member 236 can be pivoted upwardly into its FIGURE 23 position, wherein the entire posterior support structure 241 can be pivoted around a substantially horizontal axis by means of the support mechanisms 216 and 217 in a manner substantially as set forth above with respect to the corresponding structure in the apparatus 10.

The articulated frame 222 (FIGURE 22) is substantially rectangular in shape and is comprised of a foot section 242, a central section 243 and a head section 244. The foot section 242 and head section 244 are connected to the opposite ends of the central section 243 for pivotal movement with respect thereto around an axis parallel with said end element 226.

The foot section 242 is rigidly secured to and extends a substantial distance beyond the foot ends of the side elements 223 and 224, as appearing in FIGURE 22. The pivotal connection between the foot section 242 and the central section 243 is located closely adjacent the support mechanism 216. The pivotal connection between the central section 243 and the head section 244 is located above the central portions 231 and 232 of the side elements 223 and 224.

A pair of pivot posts 246 and 247 are pivotally connected at their lower ends to said central portions 231 and 232 near the lock device 233. The upper ends of the pivot posts 246 and 247 are pivotally connected to the head section 244 of the articulated frame near to but spaced from the central section 243.

A positioning rod 248 (FIGURES 22 and 23) is pivotally connected at one end to the articulated frame 222 preferably by one of the pivot elements 249 by which the head section 244 is pivotally connected to the central section 243. The other end of the positioning rod 248 extends through a positioning clamp 251 which is mounted upon the central portion 231 of the side element 223. A cam lock rod 252 (FIGURE 25), which supports a cam 253 within the positioning clamp 251, is rotatably supported upon the central portions 231 and 232 and extends transversely thereof adjacent the positioning clamp 251. An elongated, manually engageable handle 254 is connected to one end of the cam lock rod 252 and extends upwardly therefrom for manual engagement by a patient supported upon the articulated frame 222. By appropriate movement of the handle 254 around the axis of the cam lock rod 252, the cam 253 can be moved into and out of a position tightly holding the positioning rod 248 against the clamp 251 so that said rod 248 cannot slide upwardly or downwardly through the positioning clamp 251.

Three cover sheets 256, 257 and 258 (FIGURES 22 and 23) are mounted upon the foot section 242, the central section 243 and the head section 244, respectively, of said articulated frame 222 and held in position by means such as the elastic bands 259 (FIGURE 26). Two or more crossbraces 261 (FIGURE 21) may be provided between the opposite side elements 262 and 263 of the articulated frame 222 which comprise the several side elements of the sections 242, 243 and 244. The crossbraces 261, which extend between the side elements of the central section 243, have relatively long, downwardly offset central portions to prevent interference with, hence discomfort to, the patient supported upon the articulated frame 222.

Except for the size and shape of the cover sheets 256, 257 and 258 and of the elastic bands 259, they may be substantially the same as discussed above with respect to the cover sheet 108 and elastic elements 109, for example. A cushion 264 of a conventional type, such as a foam rubber pad covered by a plastic sheet, is mounted upon and carried by the cover sheets 256, 257 and 258.

In order to expedite the removal of a patient from his posterior position upon the patient support 219 or from his prone position upon the anterior support 218, it has been found advantageous to make the anterior segment 266 of the circular member 267 readily separable from the posterior segment 268. Specifically, and as shown in FIGURES 27 through 31, inclusive, this is accomplished by providing a hinge connection 269 in which the anterior segment 266 can be moved sidewardly or axially of the posterior segment 268 when said segments are in their FIGURE 30 positions with respect to each other. More specifically, the end of the segment 268 adjacent the hinge connection 269 (FIGURE 28) has a notch 271 which cooperates with a corresponding notch 272 on the adjacent end of the segment 266, whereby to provide a lapped joint. A pivot pin 273 is rigidly connected to the lapped projection 275 and is slideably but snugly received through a pivot opening 277 in the lapped projection 274.

The end surface 278 of the notch 271 is provided with a groove 279 adjacent the projection 274 into which a cooperating flange 281 on the tip of the projection 275 is slideably received. The end surface 278, the groove 279, the flange 281 and the tip surface 282 of the lapped projection 275 are all preferably curved to define circles concentric with the axis of the pivot pin 273. The flange 281 may be somewhat shorter than the full length of the groove 279 in the end surface 282, as shown in FIGURES 29 and 30, so that the segment 266 can be removed from the segment 268 without excessive pivotal movement, as shown in FIGURE 30. Also, the entry end of the groove 279 (FIGURE 31) may be flared at 283 to lead, and thereby facilitate, the entry of the flange 281 into said groove 279 during the reassembly of the segments.

The hinge axis between the segments 266 and 268 is preferably as close as feasible to the plane defined by the FIGURE 23 position of the articulated frame 222. Thus, said segment 268 creates a minimum of obstruction to the movement of a patient onto or off the posterior support structure 241 when the anterior segment 266 is removed.

The operation of the modified apparatus 210 is, except for the operation of the articulated frame 222, substantially the same as that set forth above with respect to the apparatus 10. A patient, supported upon the articulated frame 222, can be moved between the supine position and a substantially sitting position (FIGURES 23 and 22), respectively, merely by shifting his weight after the handle 254 has been moved to unlock the positioning rod 248. Specifically, the patient can move the articulated frame 222 from its FIGURE 23 position into its FIGURE 22 position simply by raising his shoulders upwardly and forwardly so that his weight is concentrated upon that portion of the head section 244 adjacent the central section 243. Likewise, the patient can move the articulated frame 222 from its FIGURE 22 position back into its FIGURE 23 position merely by urging his shoulders backwardly against the outer or upper end of the head section 244.

Although a particular preferred embodiment of the invention has been disclosed herein for illustrative purposes, it will be understood that variations or modifications of such disclosure, which come within the scope of the appended claims, are fully contemplated.

The embodiments of the invention in which an exclusive property or privilege is claimed are defined as follows:

1. An apparatus for supporting and turning a patient, comprising:
   an undercarriage having a pair of spaced, upright post means;
   first support means mounted upon one of said post means for movement with respect thereto around a substantially horizontal axis extending toward the other post means;
   second support means mounted upon the other post means for rotation with respect thereto substantially around said axis;
   first patient engaging means connected near one end to said first support means and mounted between its ends upon said second support means; and
   second patient engaging means connected at one end thereof to said first support means and engageable between its ends by said second support means, said first and second engaging means being spaced from each other and disposed at an acute angle transversely thereof.

2. A wheeled apparatus for supporting and moving a patient, comprising:
   a wheeled undercarriage having a pair of spaced, upright post means;
   first support means mounted upon one of said post means for arcuate movement with respect thereto around a substantially horizontal axis extending toward the other post means;
   second support means mounted upon the other post means for rotational movement with respect thereto, substantially around said axis;
   first patient engaging means connected near one end to said first support means and mounted between its ends upon said second support means;
   second patient engaging means connected at one end thereof to said first support means and engageable between its ends by said second support means, whereby a patient can be supported between said first and second patient engaging means; and
   positioning means on said first and second support means for limiting movement of said first and second patient engaging means away from each other, and for holding said first and second patient engaging means at a relatively small angle with respect to each other transversely thereof when they are snugly engaged by said second support means.

3. An apparatus according to claim 2, wherein said first patient engaging means is comprised of a rigid frame connected to said first and second support means;
   an articulated frame connected to and supported upon said rigid frame, said articulated frame including a central section and two end sections pivotally connected to the opposite ends of said central section, one of said end sections being rigidly secured to said rigid frame near said second support means; and
   linkage pivotally connecting said other end section to said rigid frame whereby said central section and said other section are movable with respect to each other and with respect to said first section between first positions substantially coplanar with said one section and second positions disposed at acute angles with said one section.

4. An apparatus according to claim 3, including lock means connected to and between said articulated frame and said rigid frame for releasably holding said sections in selected positions with respect to each other;
   lock means between said rigid frame and said undercarriage for releasably holding said first patient engaging means and said first and second support means against rotation around said horizontal axis; and
   wherein said rigid frame has a central portion offset away from said articulated frame opposite portions of said central section and said other end section.

5. A wheeled apparatus for supporting and moving a patient, comprising:
   an elongated wheeled undercarriage having a pair of spaced, upright post means near the opposite ends thereof;
   first support means mounted upon one of said post means for rotational movement with respect thereto around a substantially horizontal axis extending lengthwise of said undercarriage;
   second support means mounted upon the other post means for arcuate movement with respect thereto, substantially around said axis;
   first, substantially flat patient engaging means pivotally connected near one end to said first support means and mounted between its ends upon said second support means;
   second, substantially flat patient engaging means connected at one end thereof to said first support means and engageable between its ends by said second support means, whereby a patient can be supported between said first and second patient engaging means;
   positioning means on said first and second support means for limiting movement of said first and second patient engaging means away from each other, and for holding said first and second patient engaging means at an acute angle with respect to each other transversely thereof when they are properly engaged by said second support means; and
   stop means on said second support means for limiting rotation of said patient engaging means around said axes to an angle approximately equal to 180° less the amount of the acute transverse angle between said patient engaging means.

6. An apparatus according to claim 5, wherein said positioning means is arranged on said second support means so that, when said first patient engaging means is in a substantially horizontal position upon said positioning means and below said second patient engaging means, said first patient engaging means is offset slightly with respect to said horizontal axis in the direction of divergence of said acute angle, whereby the center of mass of a patient supported upon said second patient engaging means tends to remain close to said horizontal axis during said rotational movement around said horizontal axis.

7. An apparatus according to claim 5, wherein said patient engaging means comprises substantially rectangular frame members having sheet material mounted thereon:
   wherein the included transverse angle between said patient engaging means is approximately within the range of between 7° and 20°;
   wherein said patient engaging means are spaced from each other;
   wherein said first and second support means include adjustment means for changing the space between said patient engaging means; and
   wherein the distance between the closest pair of corresponding lengthwise edges of said patient engaging means is substantially less than the thickness of the patient to be supported between said patient engaging means.

8. An apparatus according to claim 5, wherein the first patient engaging means has an elongated, substantially rectangular frame with sheet means mounted thereon;
   wherein said second patient engaging means has a substantially rectangular frame member with a portion of reduced width at one end thereof, said reduced portion being inclined with respect to the remainder of said second engaging means at a small angle toward said first engaging means, and sheet means mounted upon said remainder of said second engaging means.

9. An apparatus according to claim 5, wherein said undercarriage comprises and I-shaped base frame substantially defining a rectangle;
   four swivel casters secured to said base frame near the corners of said rectangle and having wheels arranged for substantially simultaneous engagement with a flat supporting surface;
   a substantially U-shaped member having a central portion and two leg portions extending in substantially the same lateral direction from said central portion and diverging slightly therefrom, said leg portions having end portions bent with respect to said leg portions and diverging from each other; and
   bracket means connected to said base frame adjacent one of said swivel casters, said central portion being pivotally engaged by said bracket so that said U-shaped member is movable around a substantially horizontal axis transverse of the first-mentioned horizontal axis into and out of a position wherein said legs are on opposite sides of the wheel on said one caster whereby swiveled movement of said one caster wheel is prevented.

10. An apparatus according to claim 5, wherein said undercarriage comprises an I-shaped base frame substantially defining a rectangle;
   four wheeled means secured to said base frame near the corners thereof for substantially simultaneous engagement with a flat supporting surface;
   adjustment means for changing the distance between said post means; and
   pressure fluid operated means connected between said base frame and one of said post means for varying the distance between the support means mounted thereon and said base frame.

11. An apparatus according to claim 5, wherein said other post means includes near its upper end an upwardly concave, arcuate member substantially concentric with said axis;
   wherein said second support means comprises a pair of arcuate segments hingedly connected at one end of each, and holding means for retaining said segments in the form of a ring substantially concentric with said axis;
   wherein said positioning means are mounted on the convex sides of said arcuate segments for holding said patient engaging means in said angular positions when said arcuate segments form said ring;
   wherein said patient engaging means comprise substantially rectangular frames having cover means thereon; and
   wherein said second support means includes roller means supporting said segments upon said arcuate member for rotational movement around said axis.

12. An apparatus according to claim 11, wherein said one end of one of said arcuate segments has a pin opening parallel with said axis;
   a pin connected to said one end of the other arcuate segment and slideably receivable into said pin opening for rotational movement therein; and
   means comprising a groove in said one arcuate segment and a projection on the other arcuate segment removably receivable into said groove for holding said segments against axial movement with respect to each other when they substantially define a ring and for permitting relative axial movement thereof when they are pivoted a substantial distance apart.

References Cited by the Examiner
UNITED STATES PATENTS

| | | | |
|---|---|---|---|
| 552,672 | 1/1896 | Souney et al. | 5—61 |
| 2,690,177 | 9/1954 | Hogan | 5—61 X |
| 3,226,734 | 1/1966 | Coventon | 5—61 |
| 3,238,539 | 3/1966 | Koch | 5—61 |

FRANK B. SHERRY, *Primary Examiner.*

R. D. KRAUS, *Assistant Examiner.*